United States Patent
Morrison et al.

(10) Patent No.: US 11,565,313 B2
(45) Date of Patent: Jan. 31, 2023

(54) ISOSTATIC PRESSING CANISTER

(71) Applicant: Rolls Royce plc, London (GB)

(72) Inventors: Alasdair P C Morrison, Derby (GB); Ryan D Pitchford, Derby (GB); John L Sulley, Derby (GB)

(73) Assignee: ROLLS-ROYCE plc, London (GB)

(*) Notice: Subject to any disclaimer, the term of this patent is extended or adjusted under 35 U.S.C. 154(b) by 0 days.

(21) Appl. No.: 17/179,538

(22) Filed: Feb. 19, 2021

(65) Prior Publication Data
US 2021/0260653 A1 Aug. 26, 2021

(30) Foreign Application Priority Data
Feb. 24, 2020 (GB) ................................ 2002540

(51) Int. Cl.
*B22F 3/04* (2006.01)
(52) U.S. Cl.
CPC ..................... *B22F 3/04* (2013.01)
(58) Field of Classification Search
CPC ........................................................ B22F 3/04
See application file for complete search history.

(56) References Cited

U.S. PATENT DOCUMENTS

| 5,119,729 A | 6/1992 | Nguyen |
| 10,053,244 B2 | 8/2018 | Clark |
| 2007/0071632 A1* | 3/2007 | Revol ............... B30B 15/302 419/38 |
| 2011/0215510 A1* | 9/2011 | Eriksen ................ B22F 3/15 264/604 |
| 2014/0234151 A1* | 8/2014 | Care .................. C04B 35/01 419/10 |

FOREIGN PATENT DOCUMENTS

| DE | 27 24 769 A1 | 12/1977 |
| DE | 60 2004 005070 T2 | 11/2007 |
| EP | 3 501 697 A1 | 6/2019 |
| FR | 2528743 A1 | 12/1983 |
| WO | 2019/025807 A1 | 2/2019 |
| WO | WO-2019025807 A1 * | 2/2019 ............ B22F 3/15 |

OTHER PUBLICATIONS

Jun. 23, 2021 extended Search Report issued in European Patent Application No. 21153151.2.

* cited by examiner

*Primary Examiner* — Sally A Merkling
*Assistant Examiner* — Ricardo D Morales
(74) *Attorney, Agent, or Firm* — Oliff PLC

(57) ABSTRACT

An isostatic pressing canister for use in manufacturing a component by isostatic pressing is described. The canister comprises: a canister wall enclosing an internal cavity, the canister wall having an internal surface facing the internal cavity; a filling point for filling the internal cavity with powdered material, the filling point comprising a hole in the canister; and a structure supported within the internal cavity and located between the hole and the portion of the internal surface opposite the hole. A portion of the internal surface of the canister wall opposite the hole is shaped so that, during the filling of the internal cavity, powdered material falling from the hole and towards the portion of the internal surface is deflected away from the portion of the internal surface. A method of manufacturing a component using the canister is also described.

16 Claims, 8 Drawing Sheets

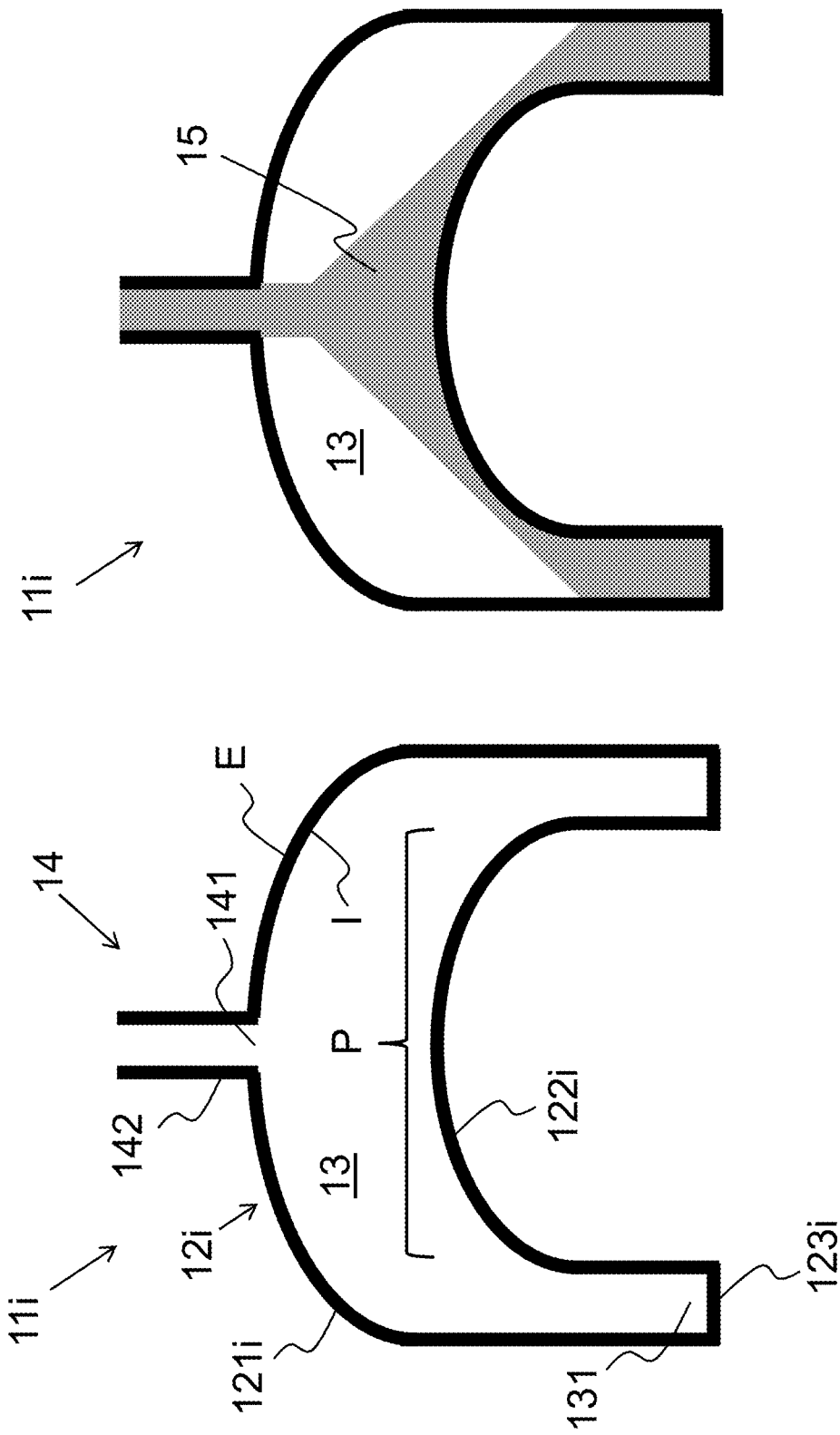

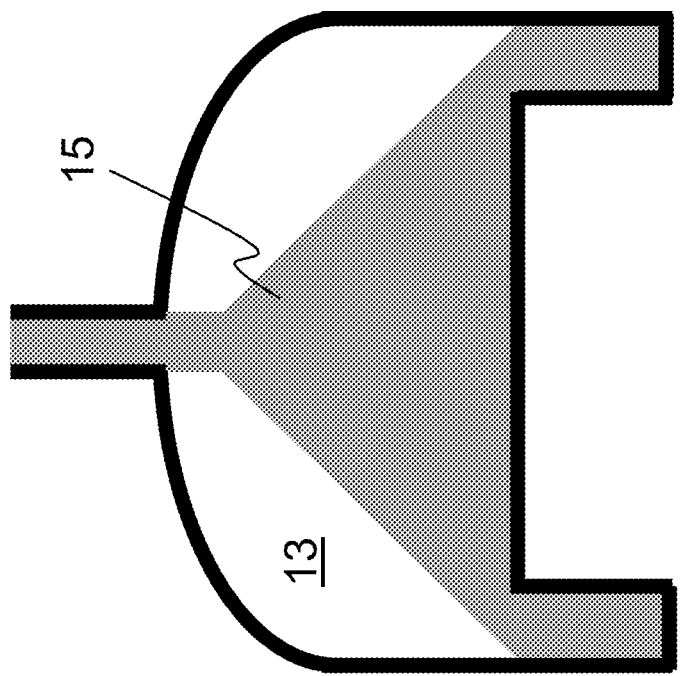
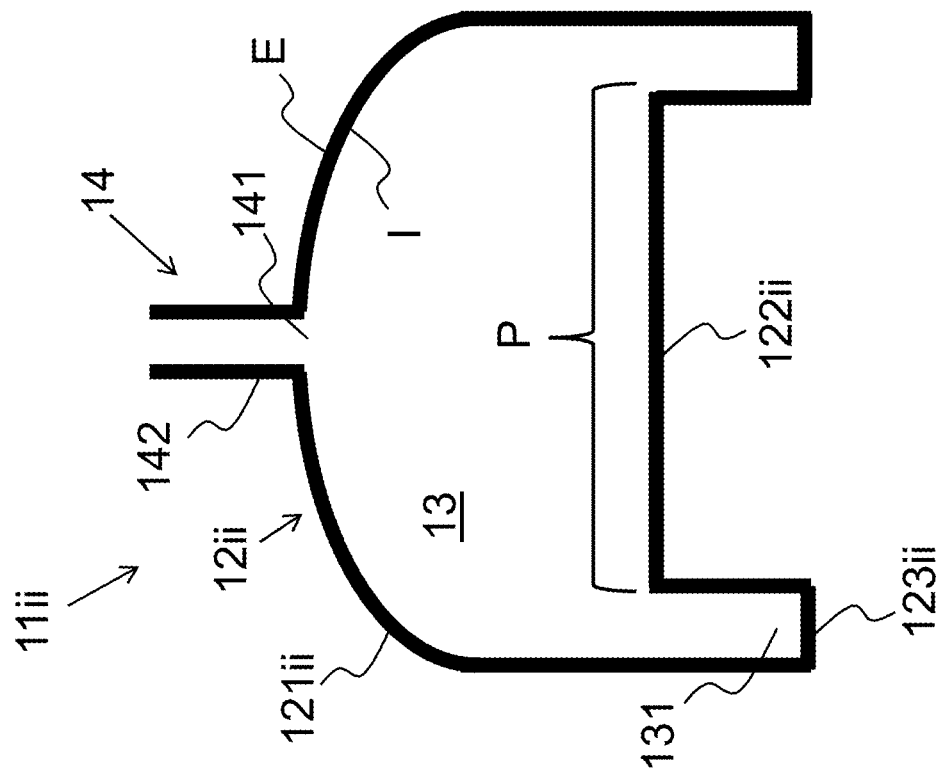
FIG. 3A
FIG. 3B

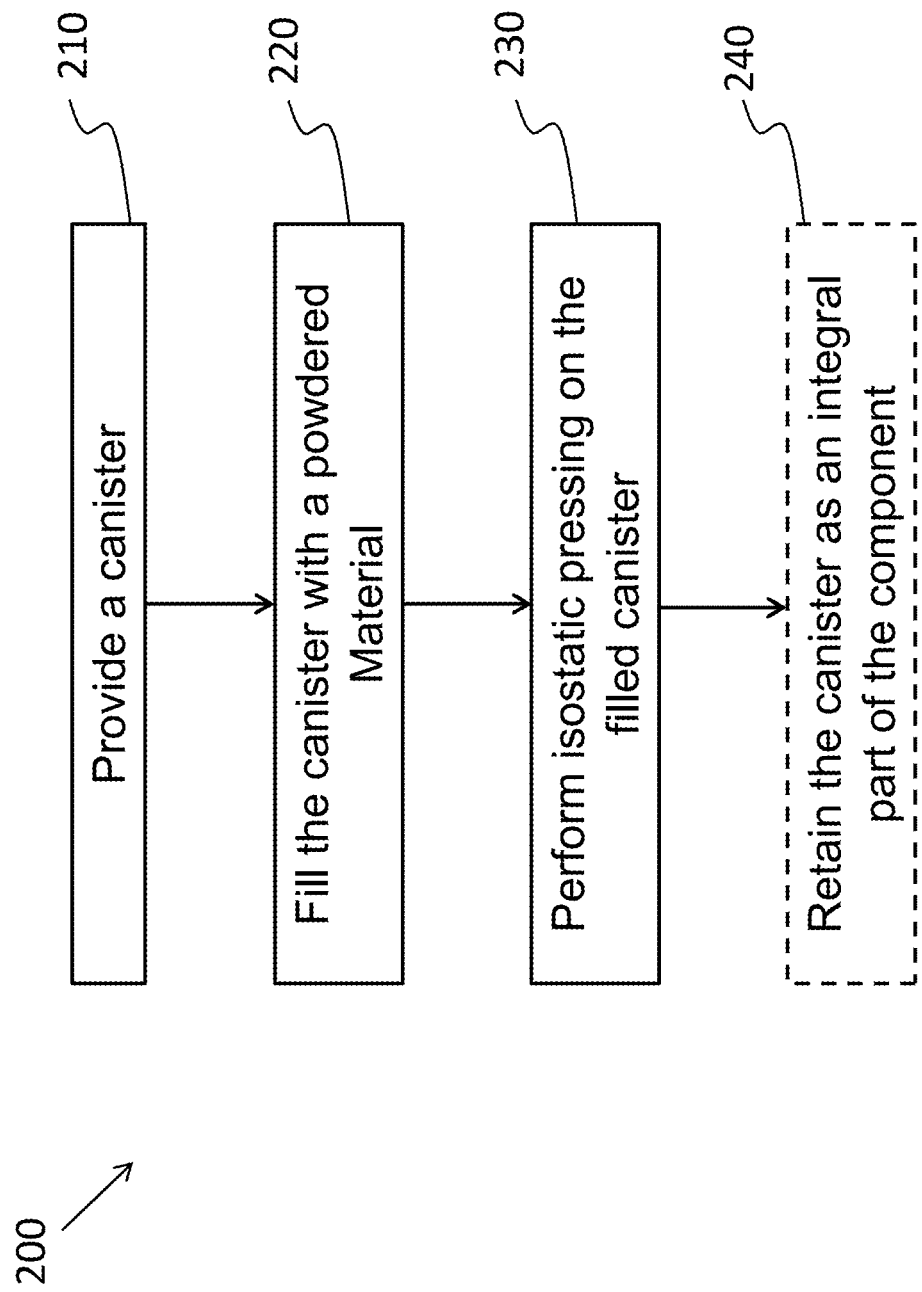

ISOSTATIC PRESSING CANISTER

CROSS-REFERENCE TO RELATED APPLICATIONS

This application claims priority pursuant to 35 U.S.C. 119(a) of United Kingdom Patent Application No. 2002540.9, filed on Feb. 24, 2020, which application is incorporated herein by reference in its entirety.

BACKGROUND

Field of the Disclosure

The present disclosure concerns the manufacture of components using isostatic pressing, and in particular to canisters for use in isostatic pressing.

Description of the Related Art

Isostatic pressing is a manufacturing technique involving the consolidation of a powdered material under high pressure conditions. A wide variety of components can be made by isostatic pressing.

The manufacture of a component using isostatic pressing, in particular hot isostatic pressing (known as HIP or HIPing), typically involves the following:

A sacrificial canister, sometimes called a HIP canister, is fabricated. The canister is made of a suitable material, often mild steel, and may be formed by machining a block or by joining together several separate portions of sheet material by welding. The HIP canister has an internal cavity having a shape corresponding to the desired shape of the component that is to be manufactured;

The internal cavity of the HIP canister is filled with a powered material, usually a metal powder or a ceramic power, via filling points located about the surface of the canister. After filling, the canister is evacuated and sealed;

The sealed canister is subject to a high isostatic pressure and a high temperature (e.g., 100-150 MPa and 1,000° C.). The combined effect of the high temperature and pressure is to force the HIP canister inward, collapsing the canister and consolidating the powder into a dense component of the desired shape;

The sacrificial HIP canister is removed from the component by a subtractive method, typically machining or acid pickling; and The component may be subject to finishing or further processing, for the example by the addition of a coating or a cladding layer for performance, protection and/or aesthetic reasons.

Canisters typically include a plurality of filling points distributed about the surface of the canister. This may facilitate the filling of difficult to reach regions of the internal cavity which may otherwise not be filled. However, the use of multiple filling points may tend to slow the manufacturing process, partly because of the need to seal each and every filling point prior to the isostatic pressing process. Furthermore, filling points are typically points of canister failure during the isostatic pressing process, so a large number of filling points is associated with a greater risk of canister failure and therefore component scrappage.

SUMMARY OF THE INVENTION

According to a first aspect of the disclosure, there is provided an isostatic pressing canister for use in manufacturing a component by isostatic pressing. The canister comprises: a canister wall enclosing an internal cavity, the canister wall having an internal surface facing the internal cavity; a filling point for filling the internal cavity with powdered material, the filling point comprising a hole in the canister; and a structure supported within the internal cavity and located between the hole and the portion of the internal surface opposite the hole. A portion of the internal surface of the canister wall opposite the hole is shaped so that, during the filling of the internal cavity, powdered material falling from the hole and towards the portion of the internal surface is deflected away from the portion of the internal surface.

Thus, by utilising the shape of the internal surface of the canister to spread the powder landing in the cavity, the powder may be more evenly spread during filling. This may permit the number of filling points needed to completely fill the container to be reduced, perhaps to as few as one. With a reduced number of filling points the canister may be more quickly sealed, saving time during the manufacturing process, and less likely to fail during the isostatic pressing process. Components such as vessels, for example pressure vessels, may be particularly suited to the application of the present disclosure because the shaped portion of the internal surface of the canister can be made to correspond to an internal surface of a dished end of a vessel without compromising the vessel design. The component may, however, be another type of component, for example a component of a gas turbine engine.

The filling point may be the sole filling point of the canister. The hole of the filling point may be concentrically aligned with a geometric centreline of the canister. The hole may be concentrically aligned with a geometric centreline of the portion of the internal surface. The filling point may be of a wide bore/diameter than those conventionally used, for example greater than 5%, greater than 10%, or even greater than 15% a width/diameter of the canister.

The portion of the internal surface of the canister wall opposite the hole may be convex in shape. The portion of the internal surface of the canister wall opposite the hole may slope (e.g. downwardly) away from the hole and towards an outer region of the internal cavity. The portion of the internal surface of the canister wall opposite the hole may be dome-shaped.

The canister wall may comprise an outer wall section surrounding, for example concentrically surrounding, an inner wall section; and an annular intermediate section between edges of the outer and inner wall sections. The internal cavity may comprise an annular cavity region defined between the outer wall section, the inner wall section and the annular intermediate section. The portion of the internal surface of the canister wall opposite the hole may be shaped so that, during the filling of the internal cavity, material falling from the hole and towards the portion of the internal surface is deflected away from the portion of the internal surface and towards the annular cavity region.

The canister further comprises a structure supported within the internal cavity and located between the hole and the portion of the internal surface opposite the hole. A surface of the structure may slope (e.g. downwardly) away from the hole towards an outer region of the internal cavity. The structure may define a channel opposite the hole so that, during the filling of the internal cavity, powdered material falling from the hole passes through the channel towards the portion of the internal surface of the canister wall.

The canister wall may comprise a hollow protrusion. The filling point may further comprise a conduit in communication with the hole for receiving powdered material and communicating it into the internal cavity; and a cross-link connecting the conduit and the hollow protrusion of the canister wall. The conduit may extend upwardly and the cross-link may slope (e.g. downwardly) from the conduit to the hollow protrusion.

According to a second aspect, there is provided the use of a canister according to the first aspect in the manufacture of a component.

According to a third aspect, there is provided a method of manufacturing a component. The method comprises: providing a canister according to the first aspect; filling the internal cavity with a powdered material; and performing an isostatic pressing process on the filled canister to consolidate the powdered material.

The method may further comprise retaining the canister as an integral part of the component such that an internal structure of the component comprises the consolidated powder material and the canister wall forms at least part of a surface of the component that covers the internal structure.

Performing the isostatic pressing process on the filled canister may comprise sealing the filling point of the filled canister, for example by mechanical crimping and/or welding. Performing the isostatic pressing process may comprise subjecting the filled canister to high pressure conditions.

The component of any of the above aspects may be or may be part of a vessel, for example a pressure vessel.

The term "canister" as used herein is not intended to be limited to any particular shape. The canister may have any suitable shape, including non-cylindrical shapes and complex shapes.

The relative terms "top", "bottom", "upper", "upward", "downward", "vertical" and "horizontal" are used herein for the case where the canister is oriented as it would be oriented during filling.

The term "isostatic pressing" encompasses Hot Isostatic Pressing (HIP) as well as Warm Isostatic Pressing (WIP) and Cold Isostatic Pressing (CIP) which take place at lower temperatures. WIP and CIP typically make use of flexible moulds as canisters, for example moulds made of elastomers or polymers though a metal of relatively thin section could also be used.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

BRIEF DESCRIPTION OF THE DRAWINGS

Embodiments will now be described by way of example only, with reference to the Figures, in which:

FIG. 2A is a schematic cross-section of a canister with a single filling point;

FIG. 2B illustrates the filling of the canister of FIG. 2A;

FIG. 3A is a schematic cross-section of another canister with a single filling point;

FIG. 3B illustrates the filling of the canister of FIG. 3A;

FIG. 7 is a flow diagram illustrating a method of manufacturing a component.

DETAILED DESCRIPTION OF THE INVENTION

Figure 1:
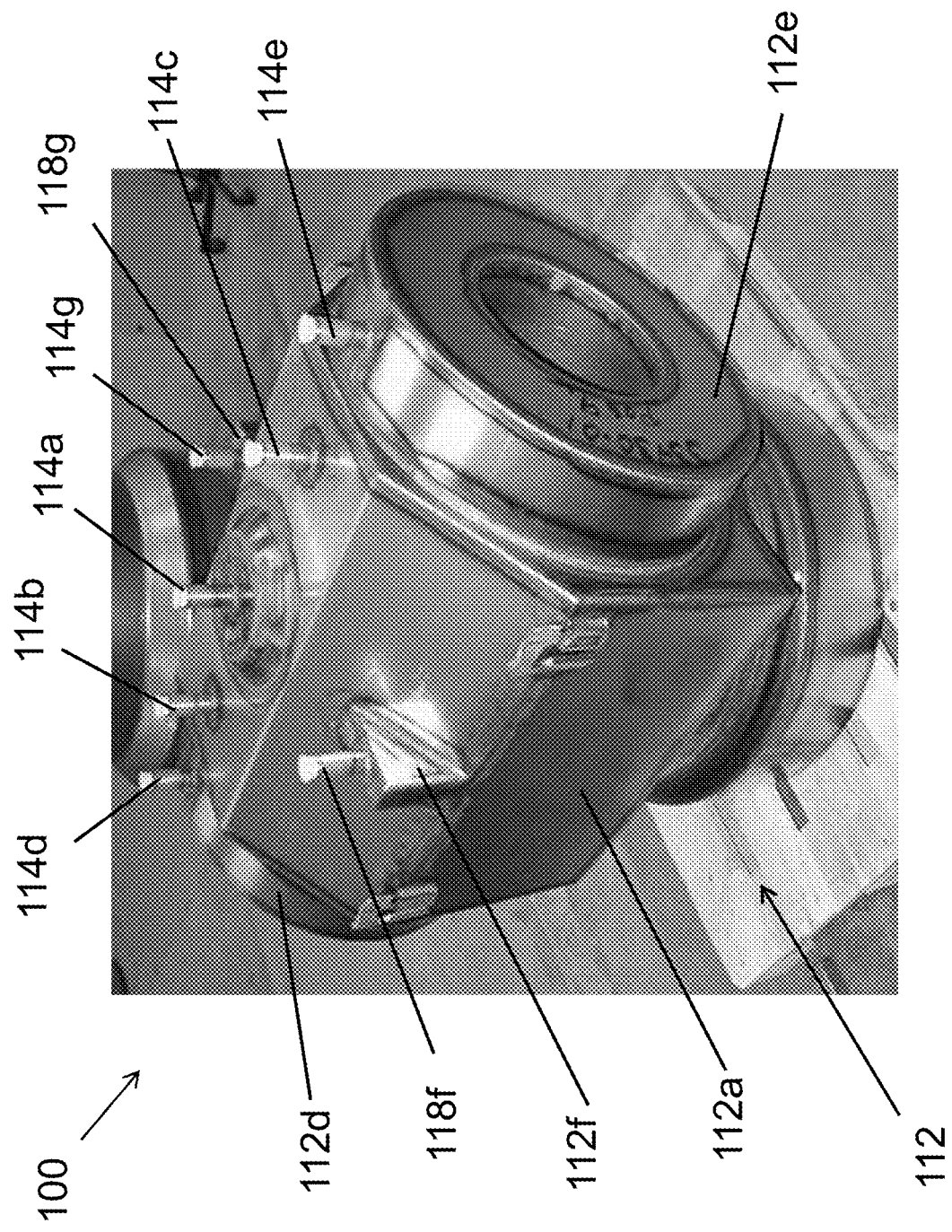
FIG. 1 shows an isostatic pressing canister with seven filling points.

FIG. 1 shows an exemplary canister 100 for use in an isostatic pressing process. The canister 100 includes a canister wall 112 enclosing an internal cavity and a plurality of filling points 114a-g distributed about an upper region of the canister wall 112. Each filling point 114a-g includes a hole in an upper surface of the canister wall and a filling pipe in communication with the hole. To fill the internal cavity, powder material from a powder reservoir (not shown) is fed into the pipes and falls typically under gravity through the holes into the internal cavity. Filling can take place in a vacuum, a controlled atmosphere in an uncontrolled atmosphere.

The shape of the canister 100 is such that the internal cavity has a relatively complex shape. For example, in addition to a main body region 112a of approximately hexagonal cross-section, the canister 100 has a pair of cylindrical end regions 112d, 112e and a pair of hollow protrusions 118f, 118g. In order to produce an acceptable component, each of the main body region 112a, the cylindrical regions 112c, 112e and the hollow protrusions 118f, 118g must be filled with powder. Filling all of these regions can, however, be problematic. For example, powder entering the internal cavity through the central filling point 114a, located at the centre of the top surface of the main hexagonal body region 112a, may tend to pile up at the centre of the main body region 112a. Powder may become piled up all the way to the filling point hole 114a, preventing the entry of more powder through the filling point 114a, before the entire main body region 112a and before the cylindrical end regions 112d, 112e and the hollow protrusions 118f, 118g have been filled.

To address this, the canister 100 of FIG. 1 is provided with additional filling points 114b-g. The filling points 114b-c can be used to ensure the entire main body region 112a can be filled, while the filling points 114d-e are used to fill or top up the cylindrical end regions 112d-e and the filling points 114f-g are used to fill or top up the hollow protrusions 118f, 118g.

While the provision of additional filling points 114b-g does allow the entire canister 100 to be filled, it is associated with disadvantages. First, after filling, each of the filling points 114a-g must be sealed, usually by welding, mechanical crimping or a combination of the two. With seven filling points 114a-g this can be a time-consuming process. Secondly, the canister 100 is generally vulnerable to mechanical failure around the filling points 114a-g during the isostatic pressing process, and the component will likely need to be scrapped if the canister fails. With seven filling points 114a-g the risk of canister failure is significantly higher than it would be if the number of filling points was, for example, one.

Aspects of the present disclosure may reduce the amount of time required to manufacture a component by isostatic pressing. Specifically, at least a portion of an internal surface of the canister opposite a filling point is shaped to promote spreading of the powder. Further, by promoting spreading, the number of filling points may be reduced to as few as one, reducing the risk of canister failure during the isostatic pressing process. This will be described in more detail below with reference to FIGS. 2-7.

FIG. 2A illustrates a first example of a canister 11*i* for forming a component. As can be seen, the canister 11*i* includes a canister wall 12*i* that encloses an internal cavity 13. The canister 11*i* further includes a single filling point 14, which includes a hole 141 in a top surface of the canister wall 12*i* and a conduit in the form of a filling pipe 142. The canister wall 12*i* has an external surface (E) and an internal surface (I) facing the internal cavity 13.

In this particular example, the canister wall 12*i* includes an outer wall section 121*i* that concentrically surrounds an inner wall section 122*i*, and an annular intermediate wall section 123*i* that joins the inner and outer wall sections at their edges. The outer and inner wall sections 121*i*, 122*i* each include an upstanding, vertically extending side wall portion such that the internal cavity 13 includes an annular portion 131 between the upstanding side wall portions and the annular intermediate wall section 123*i*. Each of the outer and inner wall sections 121*i*, 122*i* also includes a curved, central, dome-shaped portion, with a remaining portion of the cavity 13, excluding the annular portion 131, defined between the two dome-shaped portions. The canister 11*i* may be fabricated in a number of ways, for example by joining three sheet metal sections 121*i*, 122*i*, 123*i* by welding.

It will be appreciated that, due to the shape of the inner wall section 122*i*, a portion (P) of the internal surface (I) of the canister wall 12*i* that is opposite hole 141 is dome-shaped. The effect of this shape of the portion (P) of the internal surface (I) is illustrated in FIG. 2B. As can be seen, powdered material 15 entering the internal cavity 13 and falling towards the portion (P) of the internal surface (I) opposite the hole 141 is defected away from the central region of the cavity 13 and towards the outer region, in particular into the annular portion 131 of the cavity 13, spreading the falling powder evenly. This applies both initially, where the canister 11*i* is largely empty and the powder falls directly onto the portion (P) of the internal surface (I), and after the canister 11*i* is partially full, as in FIG. 2B, where falling powder will deflect off accumulating powder 15 to fill the annular portion 131 of the cavity 13.

Thus, by providing a canister 11*i* in which a portion (P) of the internal surface (I) opposite the hole 141 of the filling point 14 is shaped to deflect falling powder 15, the complex internal structure 13, 131 of the canister 11*i* can be filled without resorting to the provision of additional filling points 14. A reduction in the need to provide additional filling holes may allow for a less time-consuming canister sealing process and a reduced risk of canister failure during isostatic pressing.

FIG. 3A illustrates a second example of a canister 11*ii* in accordance with the present disclosure. The second canister 11*ii* is similar to the first canister of FIGS. 2A-2B, but differs in that the inner wall section 122*ii* includes a flat central portion instead of a domed central portion.

Despite the flat central portion of the inner wall section 122*ii*, the portion (P) of the inner surface (I) opposite the hole 141 of the filling point 14 is, overall, convex. In particular, the portion (P) of the internal surface (I) includes the flat central portion of the inner wall section 122*ii* and the upstanding, vertically extending side wall section. Thus, together the flat and upstanding portions of the inner wall section 122*ii* form a portion (P) of the internal surface (I) opposite the hole 141 that is polygonally convex.

The effect of this shape of the portion (P) of the internal surface (I) is illustrated in FIG. 3B. Initially, due to the flat central portion of the inner wall section 122*ii*, powder falling into the empty canister 12*ii* will accumulate on the flat surface without spreading to the annular portion 131 of the cavity 13. However, as shown in FIG. 3B, the accumulating powder will form a cone of powder 15 from which falling powder will deflect into the annular cavity region 131.

Thus, while in some examples the portion (P) of the internal surface opposite the hole 141 may be dome-shaped, other shapes are possible. For example, the shape of the portion (P) may be: domed, conical or pyramidal, frustoconical or trapezoidal, convex curved, or polygonally convex.

Where the shape of the portion (P) includes corners or apexes, as is the case of the canister 11*ii* of FIGS. 3A-3B, these may be rounded if the application requires a rounded shape.

Figure 4B:
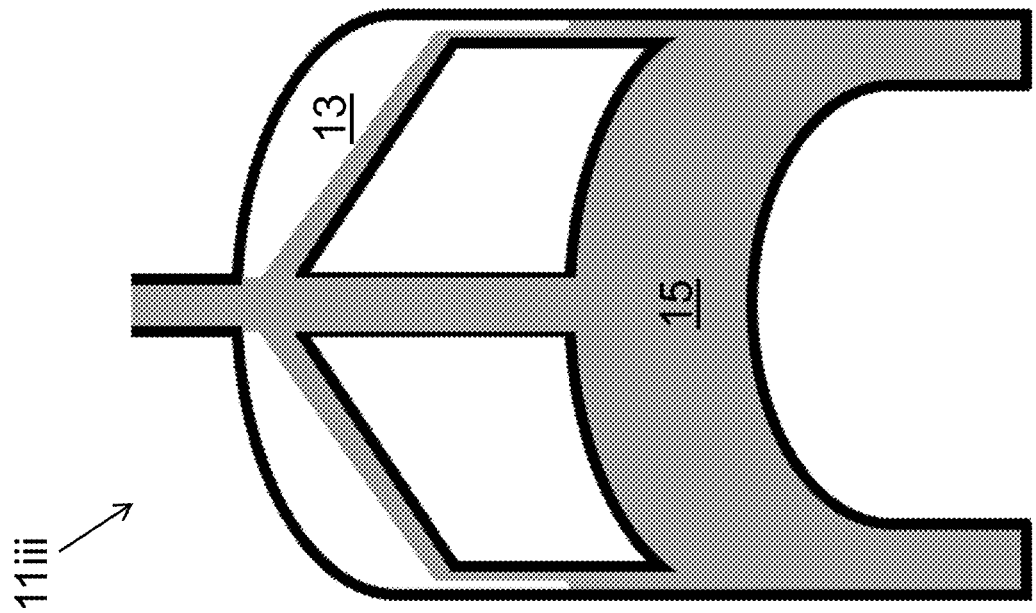
FIG. 4B illustrates the filling of the canister of FIG. 4A.
Figure 4A:
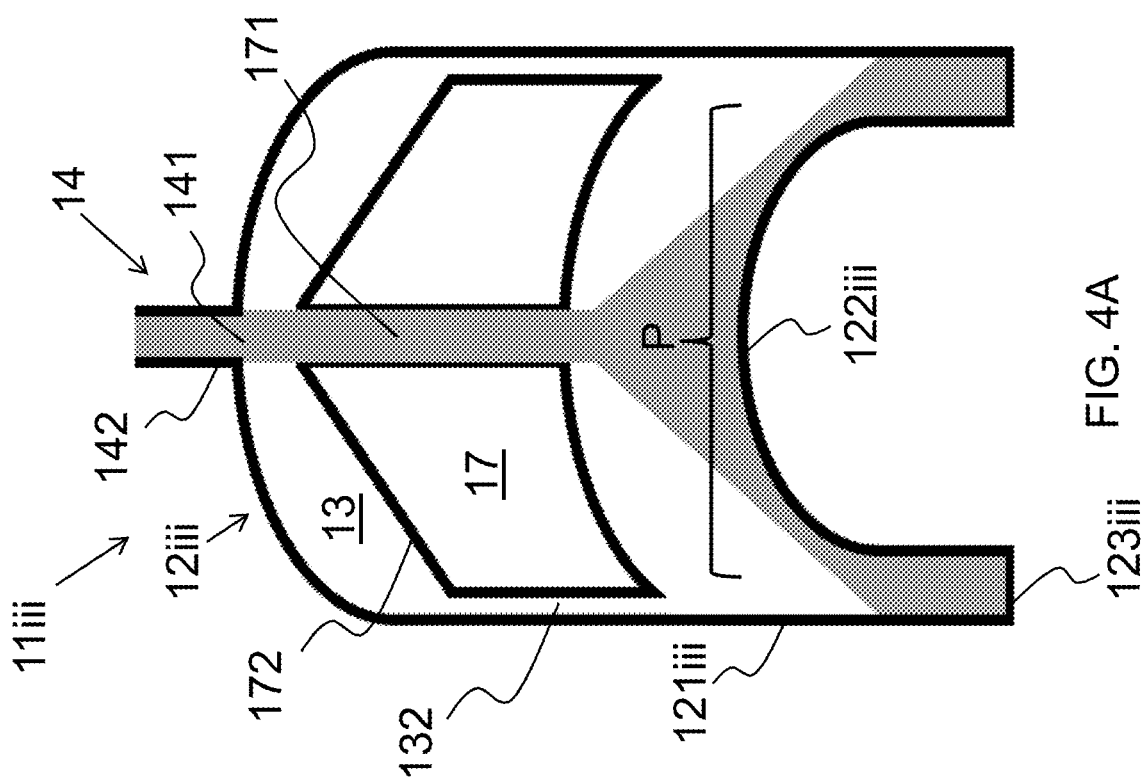
FIG. 4A is a schematic cross-section of another canister with an internal structure.

FIGS. 4A-4B illustrate a third canister 11*iii* in accordance with the present disclosure. The canister 1 1iii is similar to the canister 11*i* of FIGS. 2A-2B in that its canister wall 12*iii* includes a dome-shaped outer wall section 121*iii* concentrically surrounding a dome-shaped inner wall section 122*iii*, with an annular intermediate section 123*iii* joining the outer and inner sections 121*iii*, 122*iii* at their edges. However, unlike the canisters 11*i*, 11*ii* described above, the canister 11*iii* of FIGS. 4A-4B further includes an internal structure 17 provided between the filling point 14 and the portion (P) of the internal surface (I) that is shaped to deflect falling powder 15.

The internal structure 17 may be provided for any number of reasons, for example to provide additional component strength following isostatic pressing. It may, for example, comprise one or more sheet metal portions welded to the interior surface (I) of the cavity 13. Regardless of the reason for its inclusion, the structure 17 may be adapted so as to further promote the spreading of powder as it falls into the cavity.

In this example, the structure 17 defines a central channel 171 opposite the hole 141. As illustrated in FIG. 4A, this means that powder 15 entering the cavity 13 through the hole 141 can still fall towards the portion (P) of the internal surface that is shaped to spread the powder 15 without being blocked by the structure 17.

The structure 17 is further adapted so that, once the level of powder in the cavity 13 is such that the channel 171 has been filled with powder, unfilled regions 132 of the cavity 13 are filled with powder. In this example, it can be seen that the presence of the structure 17 in the cavity 13 has created an additional, narrow, annular region 132 of the cavity 13. As can be appreciated from FIG. 4B, this narrow region 132 remains unfilled even after the annular region 131 has been filled and the channel 171 has been filled. To ensure filling of this narrow annular region 132, without the provision of additional dedicated filling points, the structure 17 is itself shaped to fill the annular region 132. Specifically, an upper surface 172 of the structure 17 slopes downwardly from the hole 141 towards the annular region 132 so that powder 15 entering the partially filled cavity 13 is deflected towards the narrow annular region 132.

While the portion (P) of the internal surface (I) opposite the hole 141 is dome-shaped in FIGS. 4A-4B, it will be appreciated this is only by way of example and other shapes are possible as discussed above.

Figure 5B:
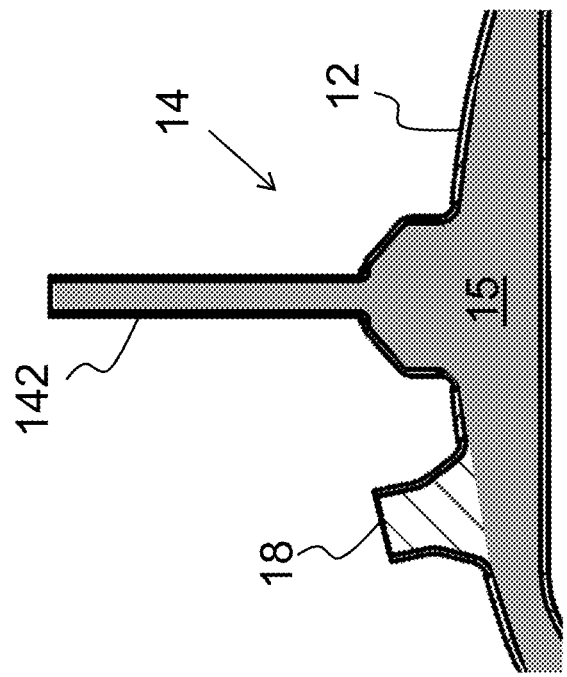
FIGS. 5A-5E are schematic cross-sections of a portion of a canister and illustrate the filling of a hollow protrusion.
Figure 5A:
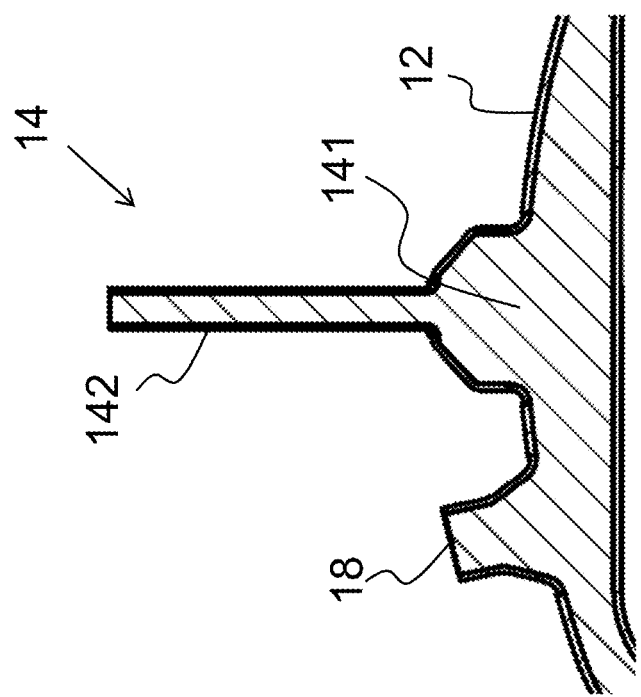

Now turning to FIG. 5A, this illustrates a top-section of a canister (canisters 11*i*-11*iii*, for example) that includes a hollow protrusion 18 in its canister wall 12. The hollow protrusion 18 protrudes outwardly from the canister wall 12, in particular from an upper surface of the canister wall 12, so as to form a region of the internal cavity 13 that is difficult to fill. This is illustrated in FIG. 5B, from which it can be seen that even with the cavity 13 and the filling pipe 142 completely filled such that no further powder can enter the cavity 13, the hollow protrusion remains unfilled.

As described above with reference to FIG. 1, one option for filling a hollow protrusion such as the hollow protrusion 18 is to provide a dedicated filling point. However, increasing the number of filling points increases the time required to seal the canister for isostatic pressing and increases the risk of canister failure during the pressing.

Figure 5C:
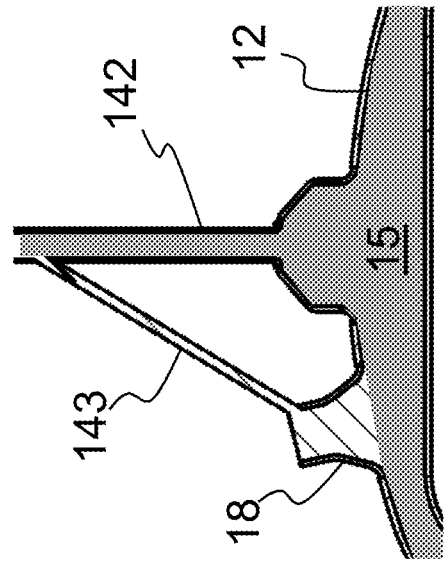
Figure 5D:
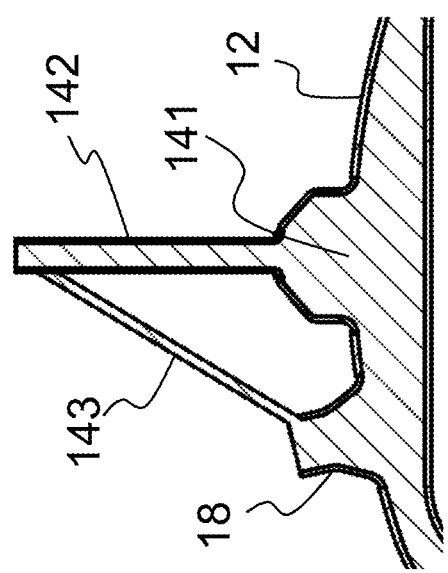
Figure 5E:
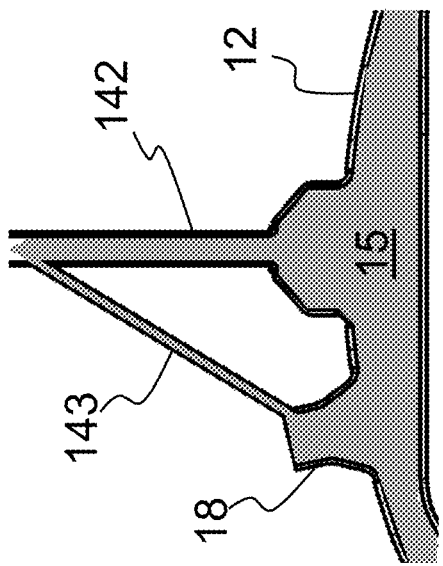

In order to fill a hollow protrusion without the need for additional filling points, FIGS. 5C-5E illustrate the use of a cross-link 143. The cross-link 143 is hollow and communicatively connects the filling pipe 142 and the hollow protrusion so that powder 15 can fill the hollow protrusion from above. The cross-link 143 may conveniently slope downwardly from a relatively upper region of the filling pipe 142 to the hollow protrusion 18 such that powder 15 entering the filling pipe 142 does not pass through the cross-link 143 until the rest of the cavity 13 is filled. This is illustrated in FIGS. 5D-5E, where it can be seen that, once the main region of the internal cavity is filled, powder 15 backs up into the filling pipe 142 until it reaches a relatively upper region of the filling pipe 142. Having backed up to the relatively upper region of the filling pipe 142, powder enters the cross-link 143 through a hole in the filling pipe 142 and descends into the hollow protrusion 18.

While FIGS. 5A-5E only illustrate a single hollow protrusion and a single cross-link, it will be understood that multiple hollow protrusions 18 and multiple cross-links 143 may be provided. Hollow protrusions 18 may be distributed about the circumference of the canister wall 12, as may the associated cross-links 143, and the cross-links 143 may drain powder from the filling pipe 142 at different heights.

Canisters according to the present disclosure may be used in the manufacture of a wide variety of components, including for example components of gas turbine engines. However, the present disclosure may be particularly applicable to the manufacture of portions of vessels, for example pressure vessels. In particular, it will be appreciated that the shape of the portion (P) opposite the hole 141 will impact the shape of the component that results from the isostatic pressing. In the case of a vessel, the portion (P) can be made to correspond to an internal surface of a dished end of a vessel without compromising the design of the vessel. In the case of other components, where the portion (P) will not correspond to a desired shape, this can be accounted for by machining or otherwise post-processing the component to its final desired shape. That is, the internal cavity 13 may be larger than the component that it to be manufactured, and the consolidated powder component can be machined down to its final dimensions.

Figure 6B:
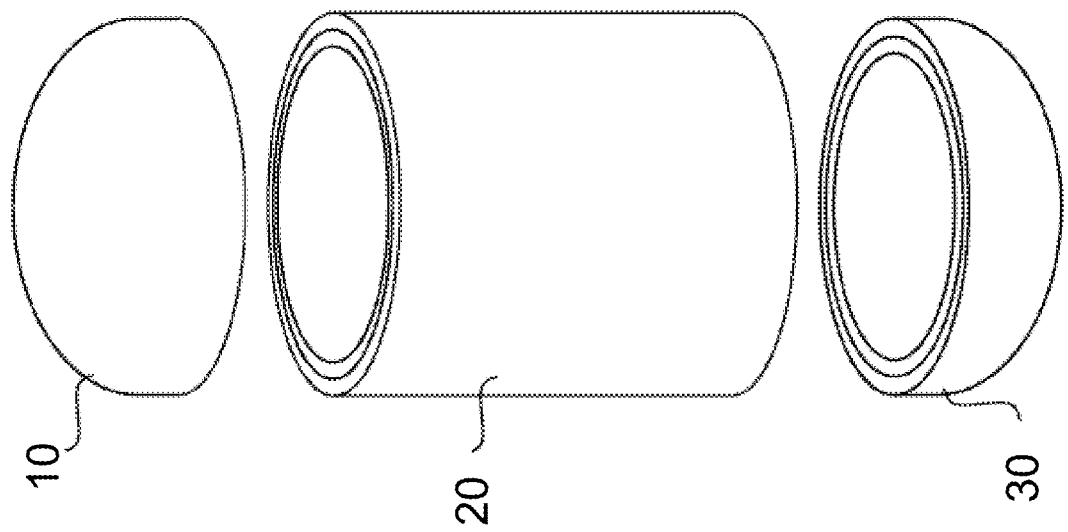
FIG. 6B is an exploded view of the pressure vessel of FIG. 6A.
Figure 6A:
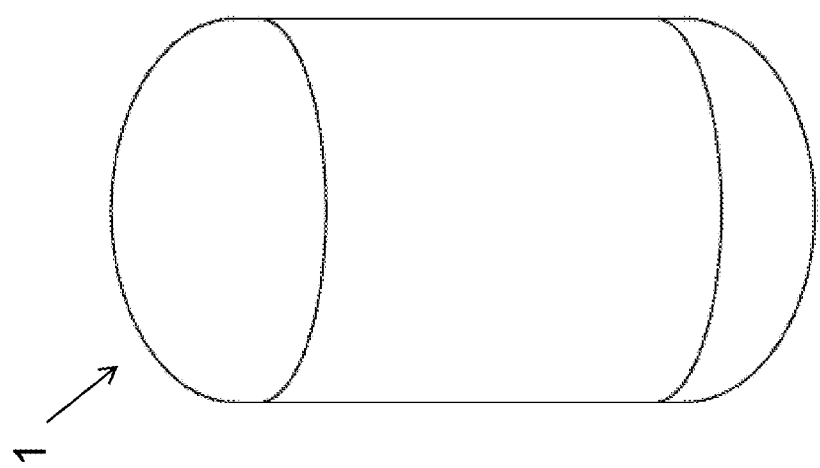
FIG. 6A is a perspective view of a component, in particular a pressure vessel.

To illustrate the application of the present disclosure to a vessel, a pressure vessel 1 such as may be used in a variety of industrial applications, is illustrated in FIG. 6A. As can be appreciated from the exploded view in FIG. 6B, the pressure vessel 1 is formed from three portions, a top dome portion 10, a middle cylindrical portion 20 and a bottom dome portion 30. Each of the three portions 10, 20, 30 is a shell such that when the three portions 10, 20, 30 are joined together the pressure vessel 1 is hollow with an interior chamber. Other pressure vessels may be formed from greater or fewer than three portions and the portions may be of different shapes. For example, the vessel 1 may have hemispherical, torispherical or ellipsoidal top and bottom portions/heads.

It will be appreciated that each of the top and bottom portions 10, 30 could be manufactured by isostatic pressing using a canister 11*i*, 11*ii*, 11*iii* as described above with reference to FIGS. 2-4. In some cases, following isotactic pressing, the collapsed canister 11*i-iii* may not be removed by machining or pickling and may instead be retained as an integral part of the structure of the vessel 1. In this case, the canister wall 12*i-iii* and its sections may conveniently be made of materials suitable to provide the resulting vessel with desired properties. For example, one or more of the wall sections (for example the inner wall section 122*i-iii*) of the canister wall 12*i-iii* may be made of a material suitable for cladding, for example stainless steel or a nickel-based alloy. As another example, one or more of the wall sections may be pre-coated with a coating material so that the vessel is pre-coated.

Now turning to the flow chart of FIG. 7, this illustrates a method 200 of fabricating a component in accordance with the present disclosure.

At 210, an isostatic pressing canister 11*i-iii* is provided. The canister 11*i-iii* has a canister wall 12*i-iii* which encloses an internal cavity 13. The canister 11*i-iii* further includes a filling point 14, which may be the sole filling point of the canister 11*i-ii*, including a hole 141 in a surface of the upper region of the canister 11*i-iii*.

The canister wall 12*i-iii* and the internal cavity 13 may, generally speaking, be of any size and shape based on the size and shape of the component that is to be manufactured. However, a portion (P) of the inner surface (I) of the canister wall, opposite the hole 141, is shaped so that powder falling into the canister will, before and/or after powder 15 accumulates, be deflected away from the portion (P). In some cases the component that is being manufactured is a portion of a pressure vessel 1, and the portion (P) corresponds, at least in part, to an internal surface of a dished end of a pressure vessel.

The canister wall 12*i-iii* may be considered to have one or more wall sections 121*i-iii*, 122*i-iii*, 123*i-iii*. The material properties and thicknesses of the wall sections may be selected so as to provide the final component with a surface having desired properties. For example, if a surface (e.g., an interior surface of a pressure vessel) of the final component should be clad with a corrosion resistant layer, a wall section 122*i-iii* of the canister 11*i-iii* corresponding to that surface of the final component may be formed of a suitable material, for example stainless steel or a nickel based alloy. Other suitable materials may include aluminides, materials comprising aluminium and/or chromium, and ceramics.

The step 210 of providing the canister 11*i-iii* may include fabricating the canister 11*i-iii*. For example, based on the size, shape and desired properties of the component, wall sections of appropriate materials, thicknesses and sizes may be selected and obtained. Processes, for example coating processes, may also be performed on the wall sections. Then, when the appropriate wall sections have been obtained, the canister 11*i-iii* may be fabricated by joining the wall sections together, for example by welding.

At 220, the internal cavity 13 of the canister 11*i-iii* is filled with an appropriate powder. The powder will be selected according to application requirements and will, generally, be a metal powder such as aluminium powder or a ceramic powder. The internal cavity 13 is filled through the filling point 14, which may be the sole filling point of the canister 11*i-iii*.

Powder 15 will fall through the hole 141 of the filling point 14 towards a portion (P) of the internal surface (I) of the cavity 13 that is opposite the hole 141. In some cases, the shape of the portion (P) is such that powder contacting from the surface will tend to deflect away from the portion (P), for example towards an outer region near side walls of the canister wall 12i-iii. In other cases, portion (P) is shaped such that powder accumulates and subsequently falling powder contacting the accumulated powder deflects away from the portion (P). In some cases, one or more hollow protrusions 18 in the canister wall 12i-iii are filled via cross-links 143 that communicatively connect a filling pipe 142 of the filling point 14 and the hollow protrusions 18.

At 230, an isostatic pressing process is performed. This will first involve sealing the filled canister by, for example, welding the canister closed, crimping of the filling pipe or any other suitable process. Any remaining unfilled volume of the canister 11i-iii may be evacuated prior to and during the sealing process. Once sealed, the filled canister 11i-iii can be introduced into a consolidation chamber as is known in the art. In the example of hot isostatic pressing, HIP, the HIP consolidation chamber subjects the filled canister 11i-iii to high pressures and temperatures, typically of the order of 1,000-1,300° C. and 100-150 MPa. The high temperatures and pressures causes the HIP powder 15 to consolidate into a denser, solid form and for the canister wall 12i-iii to collapse into the consolidated powder and form a HIP diffusion bond with the consolidated powder. Once the HIP process is complete, the canister 11i-iii is removed from the HIP consolidation chamber. Other types of isostatic pressing, for example warm isostatic pressing and cold isostatic pressing, take place at lower temperatures.

At 240, optionally, the canister 11i-iii is retained as an integral part of the final component. That is, rather than removing the canister wall 12i-iii by a subtractive process such as acid pickling, the canister 11i-iii is retained and the wall 12i-iii forms a surface of the final component. In this way, the surfaces of the component retain the material properties of the corresponding wall sections of the canister wall 12i-iii. The final component has a consolidated powder internal structure that is covered by a surface provided by the collapsed canister wall.

While the examples described above conveniently utilise only a single filling point, it will be understood that more than one filling point could be used. For example, two spaced apart filling points may be provide opposite the shaped portion (P) of the internal surface.

It will be understood that the term "canister" as used herein is not intended to be limited to any specific geometry. In particular, while the term "canister" may generally suggest a cylindrical shape, a canister according to this disclosure need not be cylindrical, and could have one of any number of complex shapes, as can be appreciated from the canisters 11i-iii of FIGS. 2-5. As used herein, a "canister" or "HIP canister" is a container that has an internal cavity for receiving powder and which is suitable for use in an isostatic pressing process.

It will be understood that while the above description generally refers to pressure vessels, other components could be fabricated according to the techniques described herein. For example, a turbine blade, blisk or other engine component could be manufactured as described herein. Where the component is a vessel or part of a vessel, the vessel may be made of any number of portions and may have any number of suitable shapes and sizes.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. An isostatic pressing canister for use in manufacturing a component by isostatic pressing, the isostatic pressing canister comprising:
   a canister wall enclosing an internal cavity, the canister wall having an internal surface facing the internal cavity;
   a filling point for filling the internal cavity with powdered material, the filling point comprising a hole in the isostatic pressing canister; and
   an internal structure supported within the internal cavity and located between the hole and a portion of the internal surface opposite the hole, wherein:
      the internal structure has an upper surface that slopes away from the hole towards an outer region of the internal cavity,
      the internal structure defines a linear channel opposite the hole so that, during the filling of the internal cavity, powdered material linearly falls from the hole and linearly passes through the linear channel towards the portion of the internal surface of the canister wall,
      the portion of the internal surface of the canister wall opposite the hole is shaped so that, during the filling of the internal cavity, powdered material falls from the hole and the linear channel and towards the portion of the internal surface and is deflected away from the portion of the internal surface, and
      the internal structure is positioned within the internal cavity so that the internal structure is surrounded by the powdered material after the internal cavity is filled with the powdered material.

2. The isostatic pressing canister of claim 1, wherein the filling point is the sole filling point of the isostatic pressing canister.

3. The isostatic pressing canister of claim 1, wherein the portion of the internal surface of the canister wall opposite the hole is convex in shape.

4. The isostatic pressing canister of claim 1, wherein the portion of the internal surface of the canister wall opposite the hole slopes away from the hole and towards an outer region of the internal cavity.

5. The isostatic pressing canister of claim 1, wherein the portion of the internal surface of the canister wall opposite the hole is dome-shaped.

6. The isostatic pressing canister of claim 1, wherein the canister wall comprises an outer wall section surrounding an inner wall section; and an annular intermediate section between edges of the outer and inner wall sections.

7. The isostatic pressing canister of claim 6, wherein the internal cavity comprises an annular cavity region defined between the outer wall section, the inner wall section and the annular intermediate wall section, and wherein the portion of the internal surface of the canister wall opposite the hole is shaped so that, during the filling of the internal cavity, powdered material falling from the hole and towards the portion of the internal surface is deflected away from the portion of the internal surface and towards the annular cavity region.

8. The isostatic pressing canister of claim 1, wherein the component is or is part of a vessel.

9. The isostatic pressing canister of claim 1, wherein the canister wall comprises a hollow protrusion.

10. The isostatic pressing canister of claim 9, wherein the filling point further comprises:
   a conduit in communication with the hole for receiving powdered material and communicating it into the internal cavity; and
   a cross-link connecting the conduit and the hollow protrusion of the canister wall.

11. The isostatic pressing canister of claim 10, wherein the conduit extends upwardly and the cross-link slopes from the conduit to the hollow protrusion.

12. A method of manufacturing a component, the method comprising the steps of:
   providing the isostatic pressing canister of claim 1;
   filling the internal cavity with a powdered material; and
   performing an isostatic pressing process on the filled isostatic pressing canister to consolidate the powdered material.

13. The method of claim 12 further comprising the step of:
   retaining the isostatic pressing canister as an integral part of the component such that an internal structure of the component comprises the consolidated powder material and the canister wall forms at least part of a surface of the component that covers the internal structure.

14. The method of claim 12, wherein performing the isostatic pressing process on the filled isostatic pressing canister comprises sealing the filling point of the filled isostatic pressing canister.

15. The method of claim 12, wherein performing the isostatic pressing process comprises subjecting the filled isostatic pressing canister to high pressure conditions of 100-150 MPa.

16. The method of claim 12, wherein the component is or is part of a vessel.

* * * * *